Nov. 28, 1967 E. W. BERGERE 3,354,481

SCREW SLOT

Filed Dec. 22, 1965

INVENTOR
EMRIC W. BERGERE
BY Emric Bergere 3,354,481
SCREW SLOT
Emric W. Bergere, 2324 Nottingham Ave.,
Los Angeles, Calif. 90027
Filed Dec. 22, 1965, Ser. No. 516,217
3 Claims. (Cl. 10—10)

This invention relates to threaded fasteners and more specifically to the slotted driving portion of bolts adapted for use in applying high torque and to be especially adapted for installations requiring high tensile pre-loads to resist reversal stresses and to reduce the wrenching slot wear of the fasteners and torquing tools.

Another object of this invention is to produce the dovetail locking contour by heading or forging instead of milling, thereby making a slot with superior grain structure to allow higher torquing-load bearing contact and reduce erosion of the slot with a subsequent increase of bolt re-use life. Heading production reduces costs from eight to ten times and holds closer tolerances than can be obtained by a cutting method.

The recess and driver for a Military Standard is dimensionally outlined in drawing MS 33750. It is the intention of this invention to head the recess which will accept and employ this outlined driver while improving the driving contact surfaces in their geometry by heading or forging said contour and which cannot be so milled as set forth in U.S. Patent No. 2,745,120 issued May 15, 1956, and entitled, Method of Milling an Undercut Slot in a Screw Head.

The range of tolerances for milling the slot, a necessity for production at a reasonable cost, produces "worse" conditions wherein when a minimum width driver is used in a maximum width and angle recess, contact is made in the plan view of the screw head at the extreme corners of the outside diameter of the head where the area of contact is zero. Simultaneously in the transverse section of the recess and driver, when the driver angle is at the minimum and the recess at the maximum, again a point contact is made—zero area. When these conditions occur together the driver at a high torquing load pushes up the slot contact surfaces at the outer diameter of the recess by exceeding the compressive strength of the metal and continuing this load produces a total shear out of the slot walls and the screw head must be drilled or milled out to replace the fastener.

This invention, besides improving the production from slot milling to heading, creates driving contact areas to reduce the torque failure by about 50% over the milled recess.

A major object of my invention is to provide a screw having a recess manufactured by heading to closer tolerances than by milling, while retaining the property of making better surface contact with the standard, presently used, drivers which are manufactured to commercial dimensional tolerances and available in the mechanic's tool box.

To produce this method, projections are formed in the heading operation at the sides of the slot which are subsequently flattened in another operation and by the cubic geometry of the projections' shape, produces a dovetail slot to receive the driver shown in the Military Standard 33750 drawing.

In the preferred method of carrying out my invention, one of the steps is to form the blank with a punch which collects sufficient material to form the head and the slot. It is also within the scope of my invention, to first form the head by upsetting or otherwise, and then the slot. The slot punch form is of a butterfly shape required to conform to the formerly milled type and to fit the locking angle of the driver under torquing loads. When the head is flattened this plan form shape is retained except that the outer vertical walls of the punched slot now becomes dovetailed.

Figure 1:
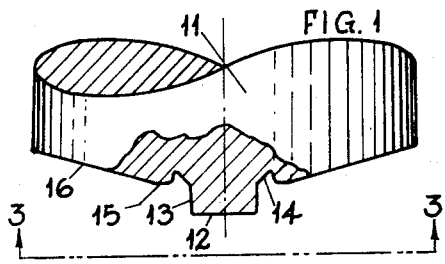
FIG. 1 is a central cross section along line 1—1 of FIG. 3, of the slot punch for a countersunk head screw showing the cavities which produce the projections for the dovetailing.
Figure 2:
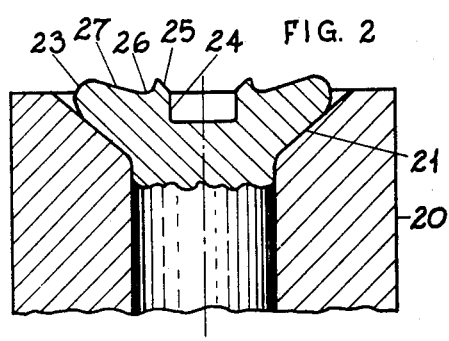
FIG. 2 is a similar section thru a pre-formed and punch-slotted head.
Figure 3:
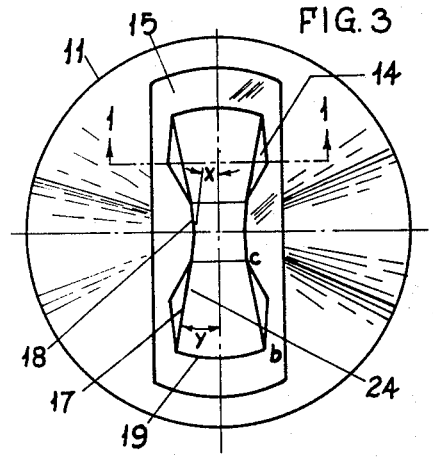
FIG. 3 is a plan form of the punch along line 3—3 of FIG. 1.
Figure 4:
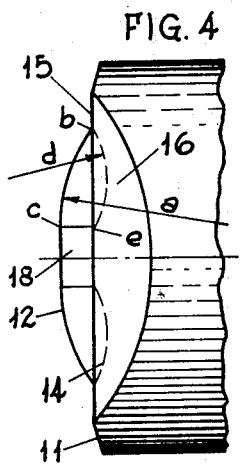
FIG. 4 is a projected side elevation of the punch in FIG. 3.

The method of making a screw slot according to the present invention employs a heading punch 11, illustrated in FIGS. 1, 3, 4, with bevelled faces 16 for head forming and a substantially circular slot punch 12, adjacent to the walls 13 thereof are cavities 14 and lands 15. The screw head shown in FIG. 2 is a countersunk type and serves to illustrate this invention which can also be applied to protruding head fasteners. The punch 11 compacts the blank in the die 20 containing head cavity 21 to a first operation form 23 and the arcuate punch section 12 with recesses 14 produces the slot walls 24 and protrusions 25. FIG. 3, while showing the plan form of the punch, also is a mirror image of the slot impression headed in FIG. 2. The contour of cavity 14 in plan form when combined with radius $d$ in FIG. 4 along $b$–$e$ provides the volumetric shape, which when flattened, produces the dovetail slot as required to fit the driver. In FIG. 3 side wall 24, along diverging line 17, is located at 9° plus or minus ½° shown as angle Y from $b$ to $c$ and from $c$ to the center of the screw at 7½° plus or minus ½° shown as angle X. The slot form resulting from this geometry allows a greater contact area with the driver to reduce the bearing stress and allow higher application of torque loads before failing the slot and torquing out the driver.

Figure 5:
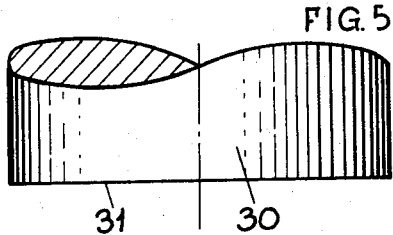
FIG. 5 is a side view of the flattening punch.
Figure 6:
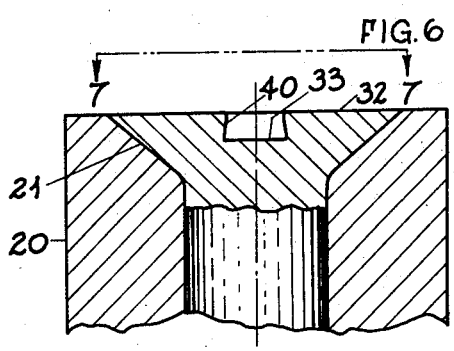
FIG. 6 is a section thru the punch with a flattened head with dovetailed slot.

In FIGS. 5 and 6 the final operation punch 30 with flattening surface 31 compacts the form shown in FIG. 2 and results in the inward movement of walls 24 forming a dovetail slot 40 relative to the bottom 33 and face 32.

Figure 9:
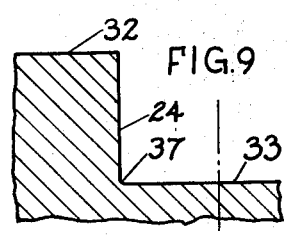
FIG. 9 is a section thru the slot along line 9—9 of FIG. 7.
Figure 7:
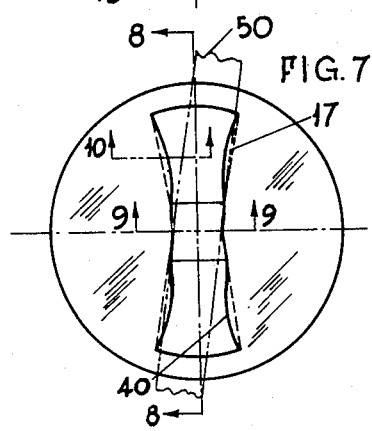
FIG. 7 is a plan view of the finished screw head.
Figure 8:
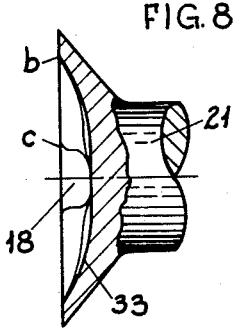
FIG. 8 is a section thru the head along line 8—8 of FIG. 7.
Figure 10:
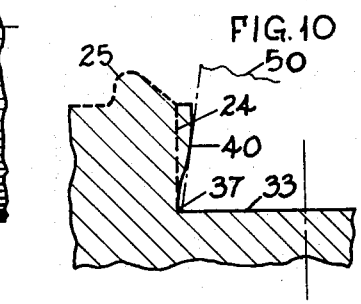
FIG. 10 is a section thru the slot along line 10—10 of FIG. 7.

FIGS. 7 and 8 shows protrusions 25 flattened and moving inward and downward according to 40 in section FIG. 10 while the center portion 18 shown in section FIG. 9 with vertical walls 24 and fillet 37 is not dovetailed. Driver 50 in FIGS. 7 and 10 contact surface 40 along 17 from $b$ to $c$ when torqued to tighten the nut and screw. The dovetailed driver in FIG. 10 contacts wall 40 without touching the corner fillet 37 and the wrenching load on this wall produces a compressive metal movement until the screw dovetail conforms to the driver thus eliminating tolerance variations between the slot and the driver angles in both the plan and section views.

While various changes may be made in the detail construction, it shall be understood that such changes shall be within the design and scope of the present invention as defined by the claims:

1. The method of forming a screw head which consists in supporting a blank in a die, striking the head portion with a combined heading and slot forming punch containing cavities to provide raised protrusions along the peripheral portions of the diverging slot faces and by striking the raised portions to cause the side walls of the slot to converge inwardly at the outer edges, retaining a vertical wall at the central portion of the slot.

2. A dovetail slot forming method as defined in claim 1, wherein the normally straight line diverging slot faces are angularly displaced for total contact with the driver to provide higher torque loading before failure of the slot walls.

3. A screw slot forming method as defined in claim 1 and 2, wherein the headed slot contour accepts the standard dovetail driver now used in milled slot screws.

References Cited

UNITED STATES PATENTS 2,182,092   12/1939   O'Leary _____ 10—10
2,304,704   12/1942   O'Leary _____ 10—10 XR LEONIDAS VLACHOS, *Primary Examiner.*